(12) United States Patent
Yoon et al.

(10) Patent No.: US 8,755,800 B2
(45) Date of Patent: Jun. 17, 2014

(54) HANDOVER METHOD

(75) Inventors: Kang Jin Yoon, Anyang-si (KR);
Byoung Hoon Kim, Anyang-si (KR);
Young Yong Kim, Anyang-si (KR);
Chung Ha Koh, Anyang-si (KR);
Kyung Min Park, Anyang-si (KR); Jae Won Lim, Anyang-si (KR)

(73) Assignees: LG Electronics Inc., Seoul (KR);
Industry-Academic Cooperation, Yonsei University, Seoul (KR)

( * ) Notice: Subject to any disclaimer, the term of this patent is extended or adjusted under 35 U.S.C. 154(b) by 414 days.

(21) Appl. No.: 13/142,829

(22) PCT Filed: Dec. 21, 2009

(86) PCT No.: PCT/KR2009/007637
§ 371 (c)(1),
(2), (4) Date: Aug. 31, 2011

(87) PCT Pub. No.: WO2010/076998
PCT Pub. Date: Jul. 8, 2010

(65) Prior Publication Data
US 2011/0306346 A1    Dec. 15, 2011

(30) Foreign Application Priority Data

Dec. 30, 2008 (KR) .................. 10-2008-0136246

(51) Int. Cl.
*H04W 36/00* (2009.01)
(52) U.S. Cl.
USPC .......................................... 455/436
(58) Field of Classification Search
USPC .......... 370/312, 329, 315, 328, 336; 455/437, 455/436, 525, 443, 444, 445, 446, 449; 726/2–6, 26–30; 709/228, 229, 227
See application file for complete search history.

(56) References Cited

U.S. PATENT DOCUMENTS

| 8,274,950 | B2 * | 9/2012 | Lee et al. | 370/332 |
|---|---|---|---|---|
| 2008/0108353 | A1 * | 5/2008 | Lee et al. | 455/437 |
| 2008/0254799 | A1 * | 10/2008 | Yahagi | 455/436 |
| 2009/0264128 | A1 * | 10/2009 | Tomisawa | 455/436 |
| 2009/0270105 | A1 * | 10/2009 | Kakumaru | 455/436 |
| 2010/0111047 | A1 * | 5/2010 | Yang et al. | 370/336 |
| 2013/0114494 | A1 * | 5/2013 | Yuk et al. | 370/312 |
| 2013/0242854 | A1 * | 9/2013 | Cai et al. | 370/315 |

FOREIGN PATENT DOCUMENTS

| KR | 1020070108324 | 11/2007 |
|---|---|---|
| KR | 10-0810479 | 3/2008 |
| KR | 1020080104390 | 12/2008 |

* cited by examiner

*Primary Examiner* — Melody Mehrpour
(74) *Attorney, Agent, or Firm* — Lee, Hong, Degerman, Kang & Waimey (57) ABSTRACT

A handover method according to one embodiment of the present invention comprises the steps of receiving the result of a cell measurement for a neighbor cell from a terminal, judging whether the neighbor cell is a near neighbor cell in accordance with the result of the cell measurement, calculating the ratio of the near neighbor cell to the total neighbor cells, and transmitting a command for a handover to a target cell to the terminal if the ratio exceeds the handover threshold value. The handover method of the present invention reduces interference between cells, and efficiently uses radio resources.

10 Claims, 12 Drawing Sheets

HANDOVER METHOD

This application is the National Stage filing under 35U.S.C. 371 of International Application No. PCT/KR2009/007637, filed on Dec. 21, 2009, which claims the benefit of earlier filing date and right of priority to Korean Application No. 10-2008-0136246, filed on Dec. 30, 2008, the contents of which are incorporated by reference herein in their entirety.

TECHNICAL FIELD

The present invention relates to wireless communication, and more particularly, to a handover method for reducing a base station congestion phenomenon.

BACKGROUND ART

In a wireless mobile communication system, an attempt to increase the cell capacity in order to support high-capacity service, such as multimedia content and streaming, and bidirectional service continues to be made. In order to increase the cell capacity, a method of using a high frequency band and reducing a cell radius is being attempted. If a cell having a small cell radius is used, there is a problem in that the cost is increased because more base stations have to be installed in the same area. If the cell radius is reduced, however, more information can be transferred because a higher frequency band than the frequency used in the existing cellular system can be used.

If the cell radius is continues to be reduced, however, there is a case where base stations are crowded in a specific area. Furthermore, interference is generated, wireless resources are inefficiently used, and system performance is degraded because the base stations are redundantly installed.

In particular, in a femtocell cellular system, a user can randomly install a femto base station (f-BS), and the f-BSs are congested owing to the installation of the f-BSs.

Accordingly, if the base station congestion phenomenon occurs, a necessity to efficiently use radio resources and reduce interference by allowing some base stations to provide service to mobile stations and some of or all the remaining unnecessary base stations to turn off power is raised.

DISCLOSURE

Technical Problem

According to an embodiment of the present invention, there is provided a method capable of reducing the handover of a mobile station or the use of radio resources in a base station stage in order to reduce a base station congestion phenomenon or an inter-cell interference phenomenon.

Furthermore, according to an embodiment of the present invention, there is provided a method capable of providing continued and satisfactory quality of service to a mobile station, suppressing interference, and more efficiently using radio resources.

Technical Solution

In an aspect of the present invention, there is provided a handover method. The method includes receiving a cell measurement result for a neighboring cell from a user equipment, determining whether the neighboring cell is a close neighboring cell based on the cell measurement result, calculating a ratio of the close neighboring cells in all neighboring cells, and if the ratio exceeds a handover threshold value, transmitting a handover command instructing the user equipment to perform handover to a target cell.

Advantageous Effects

According to an embodiment of the present invention, when base stations are overcrowded or the generation of inter-cell interference is severe, handover and the use of radio resources can be controlled using communication between base stations based on the measurement of a mobile station.

Furthermore, in a process of determining handover or the use of radio resources, a mobile station and radio resources can be managed through a relatively simple control process without the help of a central control station.

Furthermore, quality of service to a mobile station can be continuously guaranteed, and the generation of interference can be suppressed and the system capacity can be increased by reducing or obviating the use of radio resources.

Furthermore, a change of traffic and the degree of satisfaction of quality of service within surrounding neighboring cells and a serving cell area can be adaptively handled according to a system environment.

MODE FOR INVENTION

Figure 1:
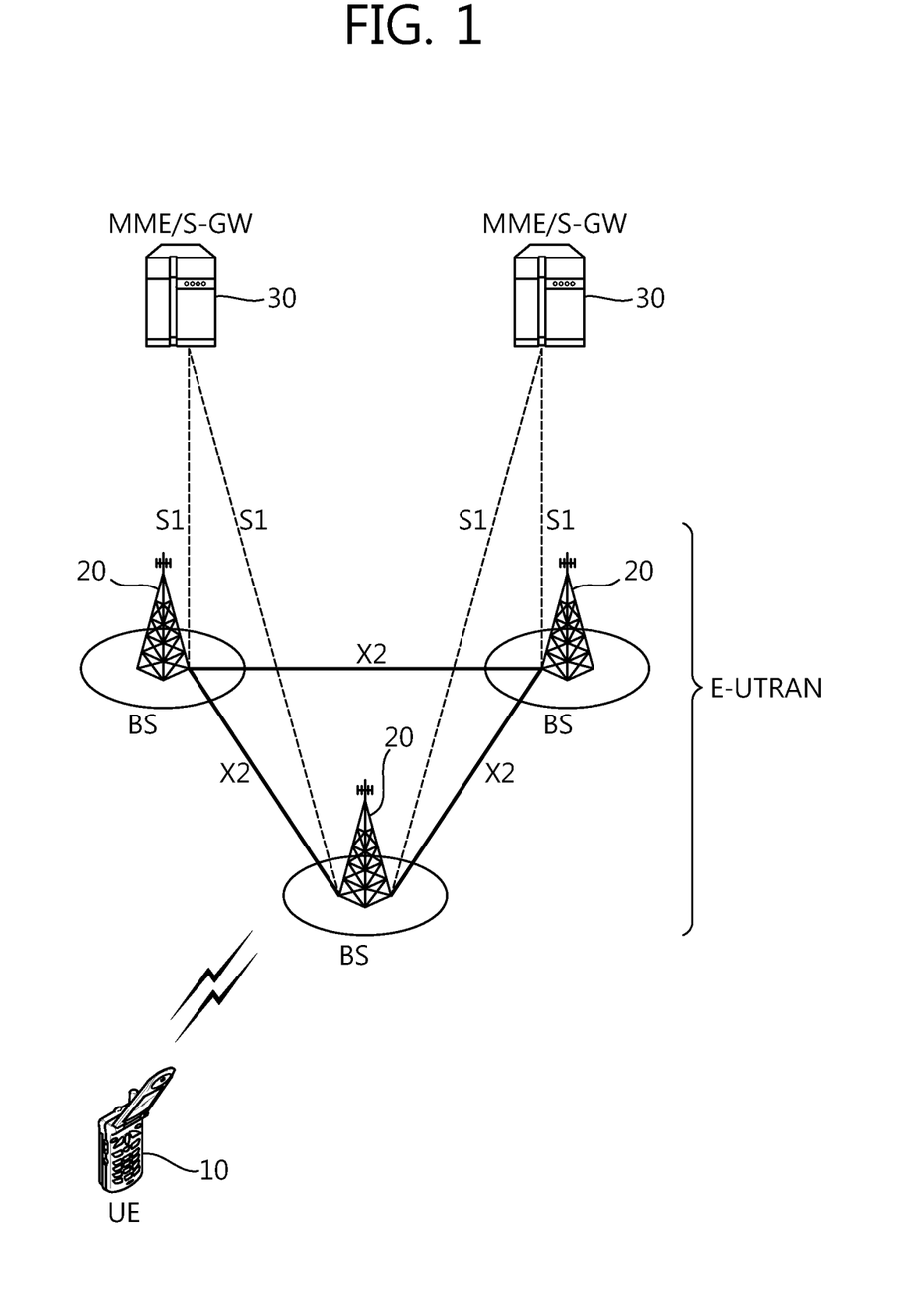
FIG. 1 is a block diagram showing a wireless communication system.

FIG. 1 is a block diagram showing a wireless communication system. The wireless communication system may be a network structure of an Evolved-Universal Mobile Telecommunications System (E-UMTS). The E-UMTS system may also be called a Long Term Evolution (LTE) system. The wireless communication systems are widely deployed in order to provide a variety of communication services, such as voice and packet data.

Referring to FIG. 1, an Evolved-UMTS Terrestrial Radio Access Network (E-UTRAN) includes Base stations (BS) 20, providing a control plane and a user plane.

A User Equipment (UE) 10 may be fixed or mobile and also be called another terminology, such as a Mobile Station (MS), a User Terminal (UT), a Subscriber Station (SS), or a wireless device. The BS 20 typically refers to a fixed station communicating with the UE 10, and it may also be called another terminology, such as an evolved-NodeB (eNB), a Base Transceiver System (BTS), or an access point.

One BS 20 can provide service to at least one cell. The cell is an area in which the BS 20 provides communication service. An interface for user traffic or control traffic transmission may also be used between the BSs 20. Hereinafter, downlink refers to communication from the BS 20 to the UE 10, and uplink refers to communication from the UE 10 to the BS 20.

The BSs 20 may be interconnected through an X2 interface. The BS 20 is connected to an Evolved Packet Core (EPC), more particularly, a Mobility Management Entity (MME)/Serving Gateway (S-GW) 30 through an S1 interface. The S1 interface supports a many-to-many-relation between the BSs 20 and the MME/S-GWs 30.

Figure 2:
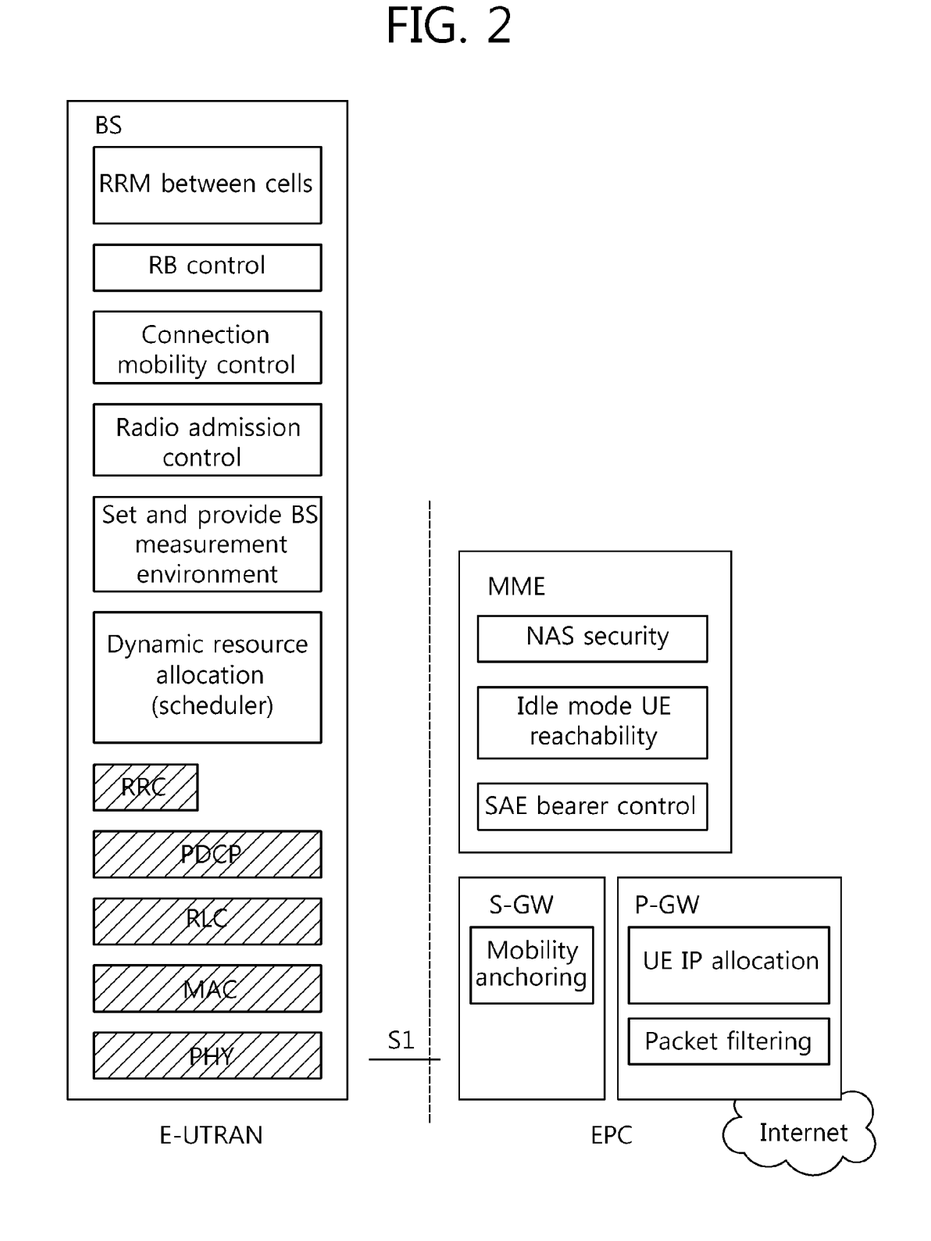
FIG. 2 is a block diagram showing a functional split between an E-UTRAN and an EPC.

FIG. 2 is a block diagram showing a functional split between the E-UTRAN and the EPC. Slant boxes indicate radio protocol layers, and white boxes indicate the functional entities of the control plane.

Referring to FIG. 2, the BS performs the following functions. (1) A Radio Resource Management (RRM) function, such as radio bearer control, radio admission control), connection mobility control, and dynamic resource allocation to UE, (2) The compression of an Internet Protocol (IP) header and the decryption of user data streams, (3) The routing of user plane data to an S-GW, (4) Scheduling and the transmission of a paging message, (5) The scheduling and transmission of broadcast information, and (6) Measurement for mobility and scheduling and setting a measurement report.

The MME performs the following functions. (1) Non-Access Stratum (NAS) signaling, (2) NAS signaling security, (3) Idle mode UE reachability, (4) Tracking area list management, (5) Roaming, and (6) Authentication.

The S-GW performs the following functions. (1) Mobility anchoring and (2) Lawful interception. A PDN-Gateway (P-GW) performs the following functions. (1) UE IP allocation and (2) Packet filtering.

Figure 3:
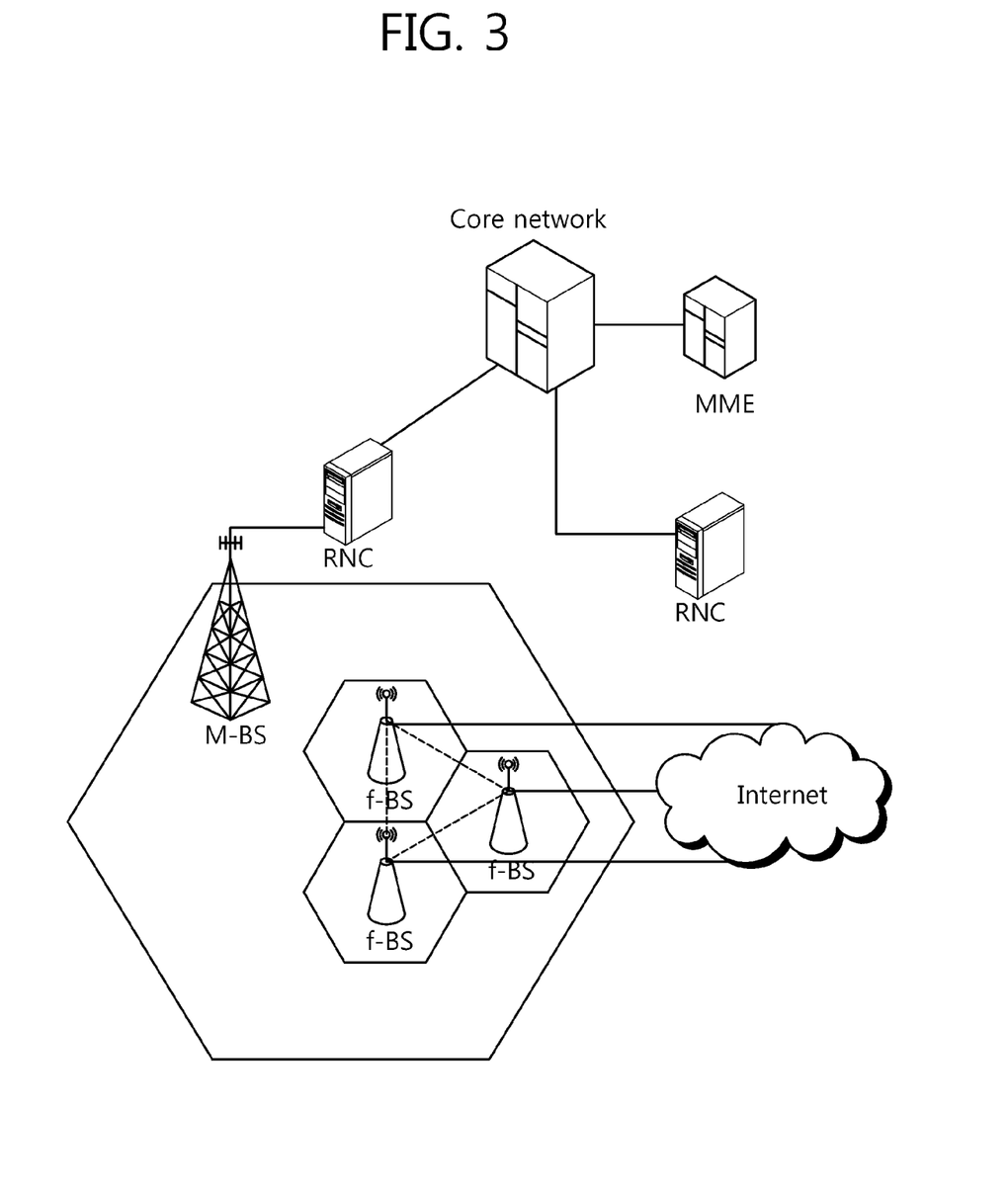
FIGS. 3 and 4 are diagrams showing femtocell systems.
Figure 4:
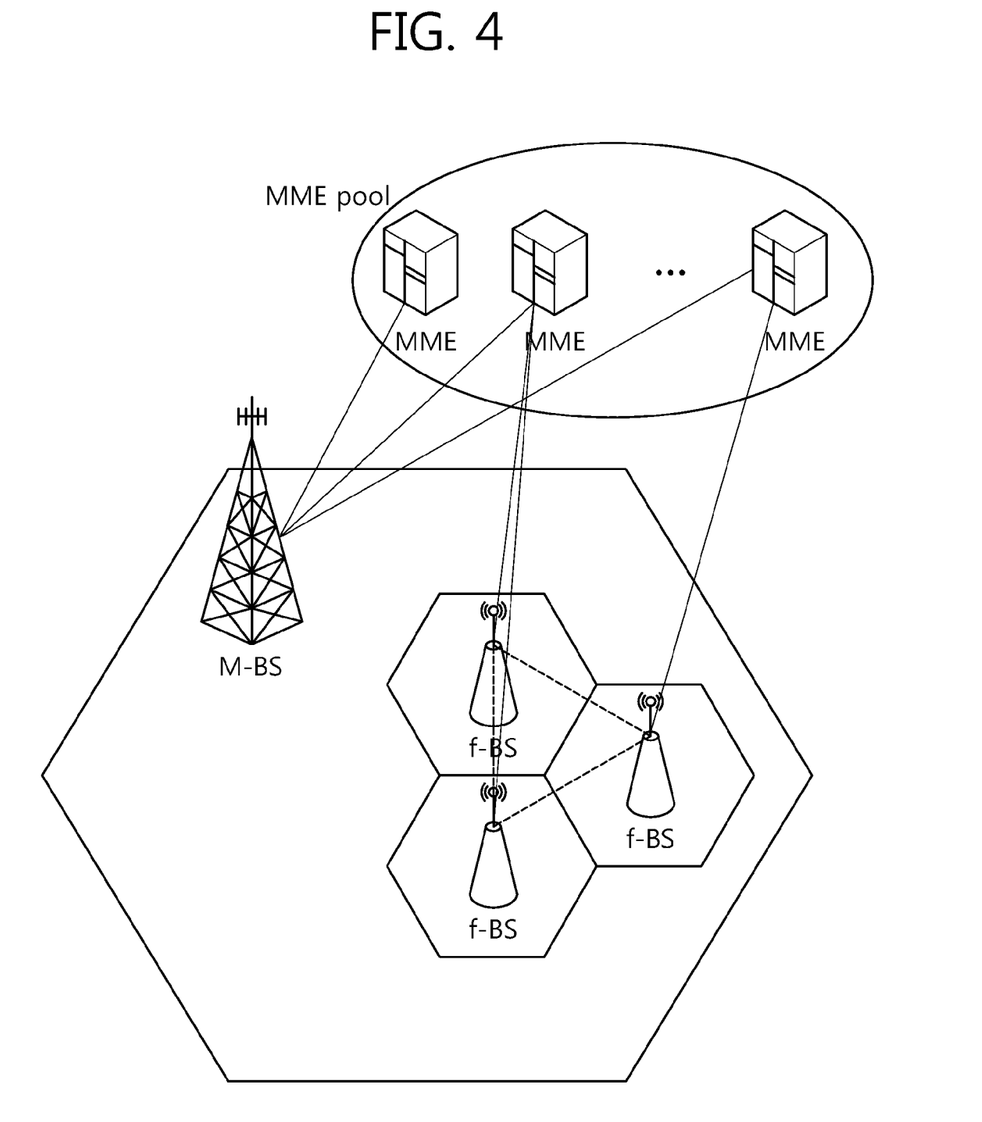

FIGS. 3 and 4 are diagrams showing femtocell systems.

A handover method according to an embodiment of the present invention may also be applied to a femtocell cellular system, including a common multi-cell environment and including f-BSs (femto base stations) (i.e., small-sized BSs installed by users and crowdedly distributed in a specific area) and UEs (User Equipments).

The femtocell cellular system, as shown in FIGS. 3 and 4, may include a Macro Base Station (M-BS), serving a wide area, and a plurality of f-BSs installed based on users. The f-BSs and a core network, as shown in FIG. 3, may be interconnected through a Femto cell Network Controller (FNC). The f-BSs may also be connected to the M-BS through the FNC, the core network, and a Radio Network Controller (RNC). Alternatively, the f-BSs, as shown in FIG. 4, may be directly connected to an MME within an MME pool and thus connected to the core network.

Each of the f-BSs is connected to the FNC over the Internet and configured to provide service to a previously registered Closed Subscriber Group (CGS) under the control of the FNC. A UE measures the signals of surrounding cells and transfers the measured signals to an f-BS corresponding to its own serving cell BS. Furthermore, the f-BS recognizes that neighboring cells exist and manages the cells using cell measurement results received from the UE.

Furthermore, the f-BSs exchanges pieces of information using a direct link or an indirect link through the FNC. Furthermore, the M-BSs other than the f-BSs can exchange pieces of information through the FNC and the RNC or the MME.

However, the f-BSs may be unnecessarily redundantly installed or crowdedly installed in a narrow area because the f-BSs are installed by users. In particular, in a residential area or an office congestion area, the interval between installed f-BSs may be narrow. Accordingly, service areas covered by several f-BSs may overlap with each other. Consequently, an interference problem may be generated between femtocell cellular systems using radio resources having the same frequency band, and the system capacity may be reduced.

However, if the FNC controls the congestion phenomenon of the f-BSs, the operating costs are increased because the FNC must control numerous f-BSs, and such control becomes also very complicated. Consequently, a system may be inefficiently operated.

Figure 5:
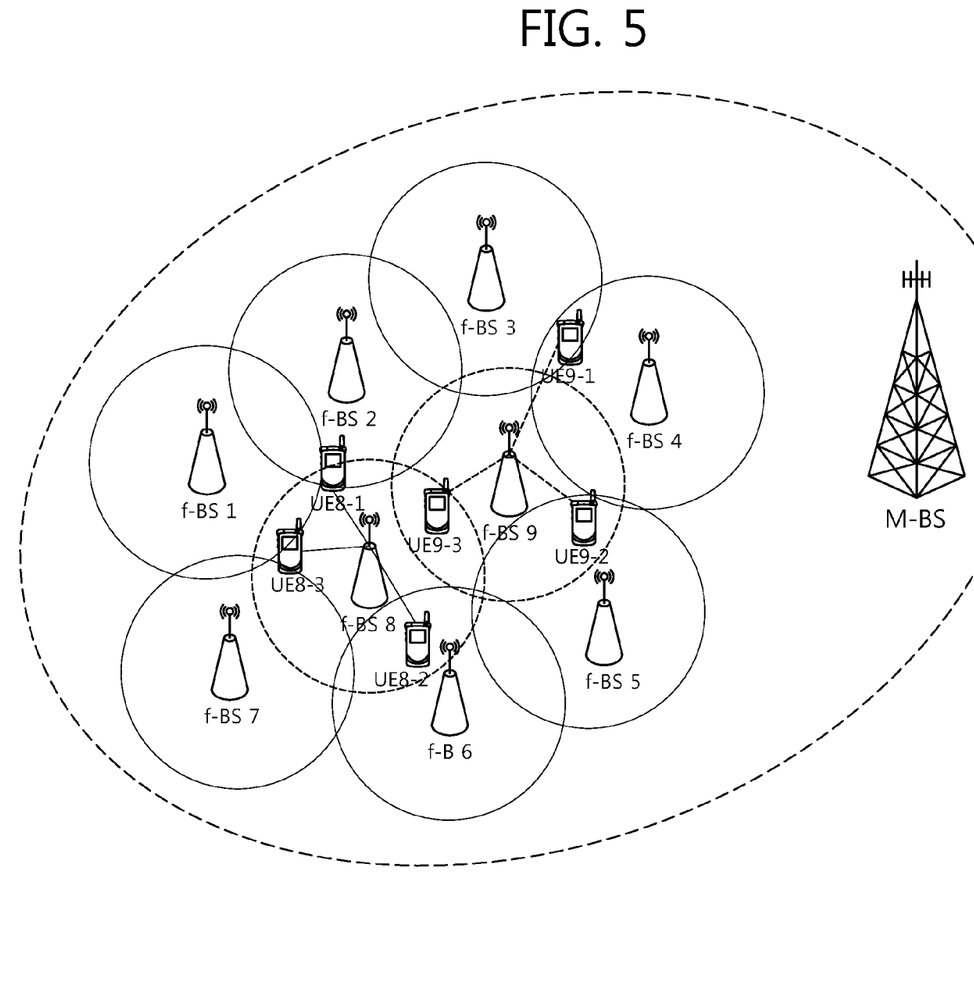
FIG. 5 is a diagram showing an area where base stations are crowded.

FIG. 5 is a diagram showing an area where BSs are crowded.

FIG. 5 illustrates a femtocell cellular system, including f-BSs, an M-BS, and UEs. Referring to FIG. 5, it can be seen that there are many areas in which cells overlap with each other.

In the case of common BSs including the M-BS described in this specification, if the installation interval between the BSs is too close, a BS congestion phenomenon may occur. In particular, in a femtocell cellular system in which BSs are installed by users, unnecessary BSs may be redundantly installed and crowdedly installed. This phenomenon becomes severe in residential and office congestion areas.

Accordingly, service areas between several BSs may overlap with each other. This generates an interference problem in a femtocell cellular system using radio resources having the same frequency band, thereby being capable of reducing the system capacity and efficiency in the use of radio resources.

The f-BSs shown in FIG. 5 have many overlapping coverage portions. From among them, in particular, an f-BS 8 and an f-BS 9 overlap with each other in a wide area. Furthermore, UEs (i.e., UE8-1, UE8-2, and UE8-3, and UE9-1, UE9-2, and UE9-3 within the coverages of the f-BS 8 and the f-BS 9 are placed at portions in which the coverages of the f-BS 8 and the f-BS 9 overlap with the coverage of other f-BSs (i.e., an f-BS 2 to an f-BS 7).

The UEs have no difficulty in receiving service even if any one of the f-BS 8 and the f-BS 9 does not exist. Accordingly, the f-BSs need not to be crowded as shown in FIG. 5, but only interference between the cells is amplified owing to the congestion of the BSs.

It is however common to the f-BS 1 to the f-BS 9 in that they are all distributed in the area where the BSs are crowded. All the cells covered by the BSs correspond to neighboring cells. However, in particular, neighboring cells closely placed each other, from among the neighboring cells, can be classified. The neighboring cells closely placed each other are referred to as close neighboring cells.

In order to improve the inefficient use of radio resources and a reduction in system performance due to interference occurring owing to the unnecessary and redundant installation of f-BSs, an embodiment of the present invention proposes a method of an f-BS detecting that it is placed in a congestion area without the help of a central controller, such as an FNC, (this detection method is called self-organized detecting) and capable of solving the congestion phenomenon.

For example, a BS may handover (HO) a UE within its own coverage to a neighboring cell, and a relevant BS may be turned on or off partially or fully, in order to reduce interference and efficiently use radio resources.

Figure 6:
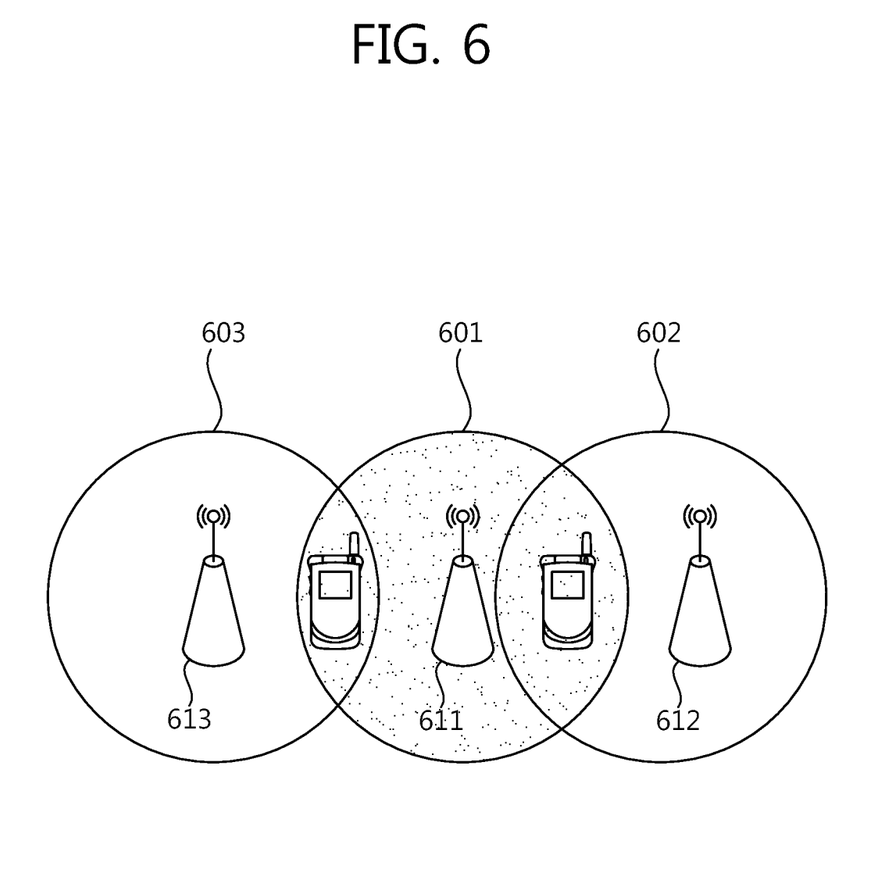
FIG. 6 is a diagram by contrast showing a neighboring cell and a close neighboring cell which are classified in a handover method according to an embodiment of the present invention.

FIG. 6 is a diagram by contrast showing a neighboring cell and a close neighboring cell which are classified in the handover method according to an embodiment of the present invention.

FIG. 6 shows a cell 1 601, a cell 2 602, and a cell 3 603 which overlap with each other. The serving cell of a UE is the cell 1 601, and the cell 2 602 and the cell 3 603 are the neighboring cells of the cell 1 601 which is the serving cell. It can be seen that the area in which the cell 2 602 overlaps with the cell 1 601 is wider than the area in which the cell 3 603 overlaps with the cell 1 601 and the distance between the BS 611 of the cell 1 601 and the BS 612 of the cell 2 602 is closer than the distance between the BS 611 of the cell 1 601 and the BS 613 of the cell 3 603.

In this case, the cell 3 603 may become a neighboring cell of the cell 1 601, and the cell 2 602 may become a close neighboring cell of the cell 1 601. If a certain number of close neighboring cells or higher exist nearby or if a ratio of close neighboring cells in neighboring cells is a certain value or higher, a BS recognizes that it is placed in the congestion area, and the BS or a UE may use the handover method according to an embodiment of the present invention.

In order to distinguish a close neighboring cell from neighboring cells, a cell measurement method using a reference signal may be used. A more detailed criterion or method for distinguishing a close neighboring cell from neighboring cells is described below.

Figure 7:
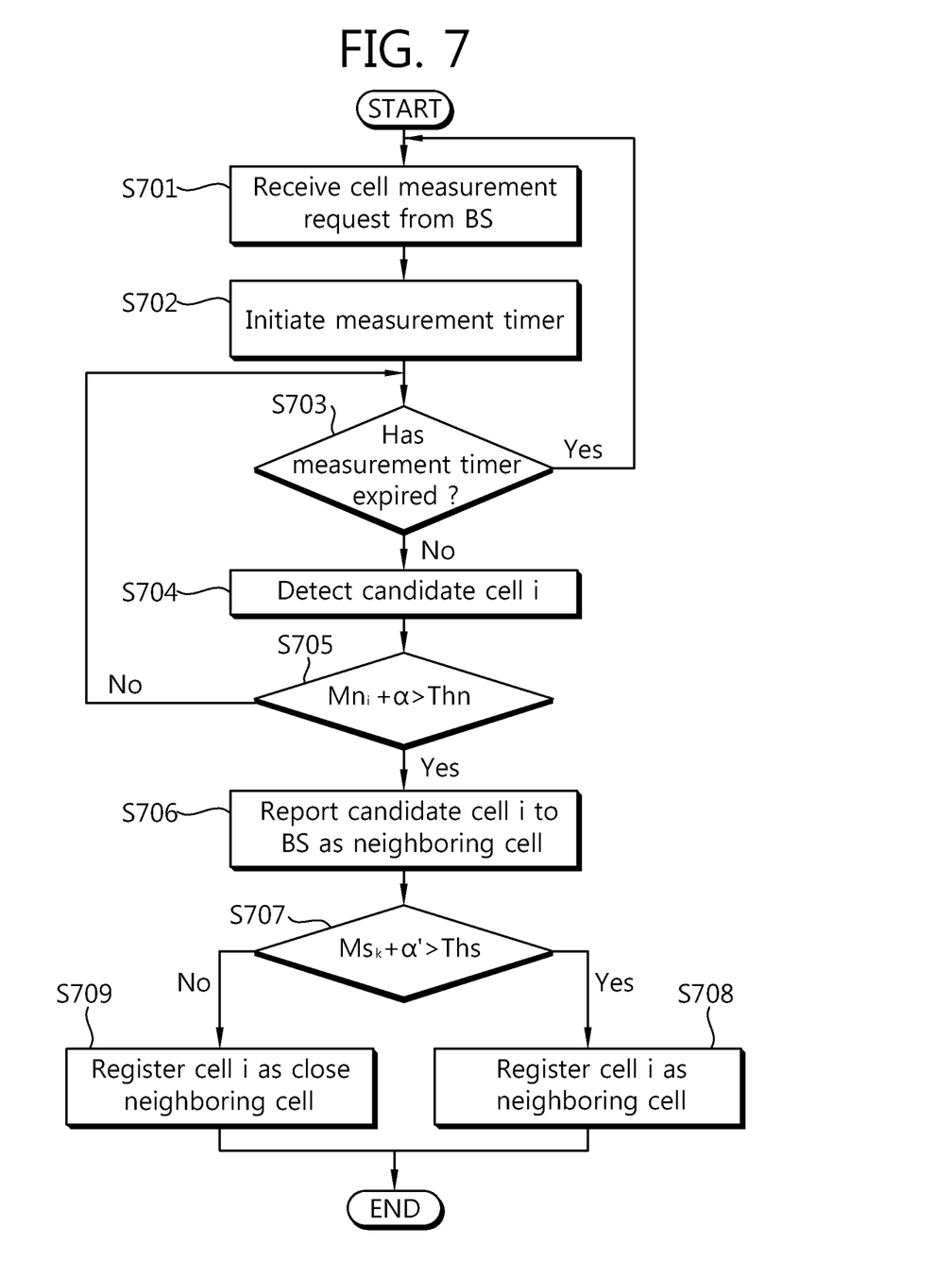
FIG. 7 is a flowchart illustrating a process of a base station detecting a close neighboring cell.

FIG. 7 is a flowchart illustrating a process of a BS detecting a close neighboring cell. Neighboring cells may be first detected, and a close neighboring cell may be then detected from among the neighboring cell.

A UE receives a cell measurement request from a BS at step S701. In response to the cell measurement request, the UE performs cell measurement for other cells placed near a serving cell. Of course, even if a cell measurement request is not received from the BS, the UE may perform the cell measurement according to the degree of interference or a predetermined basis, such as a predetermined cycle.

In order to start the cell measurement, the UE initiates a measurement timer at step S702. If the measurement timer has not yet expired at step S703, the UE may detect a candidate cell i at step S704. Next, the UE compares the intensity of a reference signal for the candidate cell i and a neighboring cell threshold value Thn at step S705. In other words, the UE determines whether the addition ($Mn_i+\alpha$) of $Mn_i$, indicating the intensity of the reference signal between the candidate cell i and the UE, and an offset value $\alpha$ is greater than the neighboring cell threshold value Thn.

If the addition ($Mn_i+\alpha$) of the intensity of the reference signal and the offset value is greater than the neighboring cell threshold value, the candidate cell i is classified as a neighboring cell. The UE may report the candidate cell i to the BS as the neighboring cell at step S706.

If the value ($Mn_i+\alpha$) is smaller than the neighboring cell threshold value and the measurement timer has not yet expired, the UE detects another candidate cell, performs cell measurement for the detected candidate cell, and determines whether the candidate cell is a neighboring cell.

If the measurement timer has expired, the UE waits to receive a new cell measurement request. When the cell measurement request is received from the BS, the UE may perform cell measurement, etc. in response to the cell measurement request.

After the UE determines whether candidate cells are neighboring cells according to the above process, the UE determines whether the neighboring cells correspond to a close neighboring cell at step S707.

If the sum of a value $Ms_k$, indicating the intensity of a reference signal between the UE and the BS of a current serving cell, and an offset value $\alpha'$ differently set from the previous offset value is greater than a threshold value Ths, the UE determines a relevant neighboring cell i is a close neighboring cell. In other words, the neighboring cell i, satisfying the condition $Mn_i+\alpha'>$Thn and also satisfying the condition $Ms_k+\alpha'>$Ths, corresponds to a close neighboring cell at step S708. The neighboring cell i not satisfying the condition $Ms_k+\alpha'>$Ths is registered as the neighboring cell at step S709. $\alpha$ and $\alpha'$ are values which may be differently set according to a system depending on whether the range of a close neighboring cell will be recognized to what extent or with consideration taken of a radio environment in which a BS and a UE are placed.

The cell i determined as the close neighboring cell may be registered in a close neighboring cell list.

Determines a neighboring cell: [$Mn_i+\alpha>$Thn]

Determine a close neighboring cell: [$Mn_i+\alpha>$Thn] and [$Ms_k+\alpha'>$Ths]

That is, when the intensity of a reference signal between a UE and a cell i is greater than a first threshold value and the intensity of a reference signal between the UE and a serving cell is also greater than a second threshold value, the cell i is a neighboring cell and is also a close neighboring cell. Here, the first threshold value and the second threshold value may be values previously set in the UE or a BS stage.

Here, the neighboring cell list or the close neighboring cell list is integrally managed by the BS from a viewpoint of the BS, rather than indicating an individual relationship with each UE and each neighboring cell.

Accordingly, if two or more UEs report redundant or contrary results for the same cell, the BS may process the neighboring cell list or the close neighboring cell list as follows.

In the case where a UE 1 and a UE 2 report a cell i as a neighboring cell, they have reported that the cell i is not a close neighboring cell in both the cases, and the cell i has never been determined as a neighboring cell or a close neighboring cell, a BS registers the cell i in a neighboring cell list only once. If the cell i has been previously determined as a neighboring cell, the BS does not update the neighboring cell list.

In the case where the UE 1 and the UE 2 report the cell i as a neighboring cell and a close neighboring cell, if the cell i has not yet been registered as the close neighboring cell, the BS registers the cell i in the close neighboring cell list. If the cell i has already been registered in the close neighboring cell list, the BS does not update the close neighboring cell list. If the cell i has been registered only as the neighboring cell, the BS registers the cell i as the close neighboring cell.

If the UE 1 and the UE 2 report contrary reports, for example, if the UE 1 reports the cell i as a neighboring cell and the UE 2 reports the cell i as a close neighboring cell, the BS registers the cell i in the list as the close neighboring cell. If the cell i has already been registered as the close neighboring cell, the BS does not update a relevant list. If the cell i has already been registered as the neighboring cell, the BS updates a relevant list by changing the cell i as the close neighboring cell.

In the above lists, each of the cells is included in the neighboring cell or the close neighboring cell only once. Even if redundant reports are made, one cell is registered only once. If there are one or more reports, indicating that a specific cell is a close neighboring cell, based on previous records or different reports, the specific cell is registered as a close neighboring cell.

Figure 8:
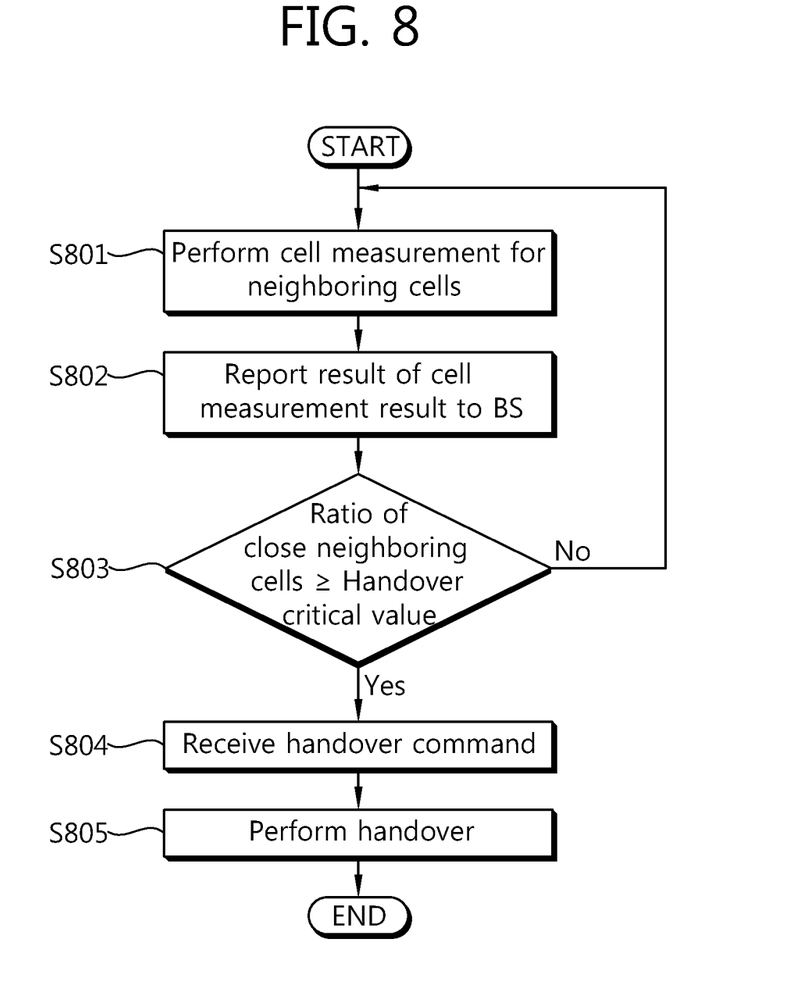
FIG. 8 is a flowchart illustrating a process of a mobile station performing handover according to an embodiment of the present invention.

FIG. 8 is a flowchart illustrating a process of a UE performing handover according to an embodiment of the present invention.

The UE performs cell measurement for neighboring cells at step S801. The UE may perform the cell measurement by measuring the intensity of a reference signal. The UE reports a result of the cell measurement result to a BS at step S802.

When the UE measures the intensity of the reference signal and reports only the result to the BS, the BS may determine whether a neighboring cell (i.e., the subject of the cell measurement) corresponds to a close neighboring cell according to the intensity of the reference signal.

Alternatively, the UE may determine whether the intensity of the reference signal is a specific value or higher or even whether a neighboring cell (i.e., the subject of cell measurement) corresponds to a close neighboring cell and report a result of the cell measurement, including a result of the determination, to the BS.

The BS may determine whether surrounding neighboring cells correspond to a close neighboring cell based on the result of the cell measurement received from the UE and, if the surrounding neighboring cells are determined to correspond to the close neighboring cell, a ratio of close neighboring cells in all the neighboring cells.

Here, the BS determines whether a ratio of the close neighboring cells is a reference value or higher at step S803.

Furthermore, when $Rc_i$ (i.e., a value indicating the ratio of cells determined as a close neighboring cell, from among all neighboring cells) is greater than a threshold value ThRc, a relevant f-BS determines that it is placed in a congestion area. The threshold value ThRc indicates a threshold value which is the ratio of close neighboring cells for which the handover of a UE will be requested from a neighboring cell or a close neighboring cell.

$Rc_i$=(Number of cells determined as a close neighboring cell/Total number of neighboring cells) >ThRc When the value $Rc_i$ is greater than the threshold value ThRc, it corresponds to a case where the ratio of close neighboring cells is excessively high. A relevant BS may determine that the close neighboring cells are distributed in the congestion area. In this case, the relevant BS is close to neighboring cell BSs, thereby being capable of generating an interference problem. Accordingly, the BS under this situation can reduce the amount of interference by attempting a method, such as handover.

That is, when the ratio of neighboring cells determined as a close neighboring cell is the reference value or higher, the BS determines that it is now placed in the congestion area and instructs the UE to perform handover.

The UE receives the handover command from the BS at step S804 and performs handover to a target cell at step S805. After the UE performs handover to the target cell, the BS may recover radio resources allocated to the UE or may stop the use of the radio resources. The BS may reduce interference with other BSs by stopping the use of the radio resources, allocated to the UE, for a certain period of time.

Figure 9:
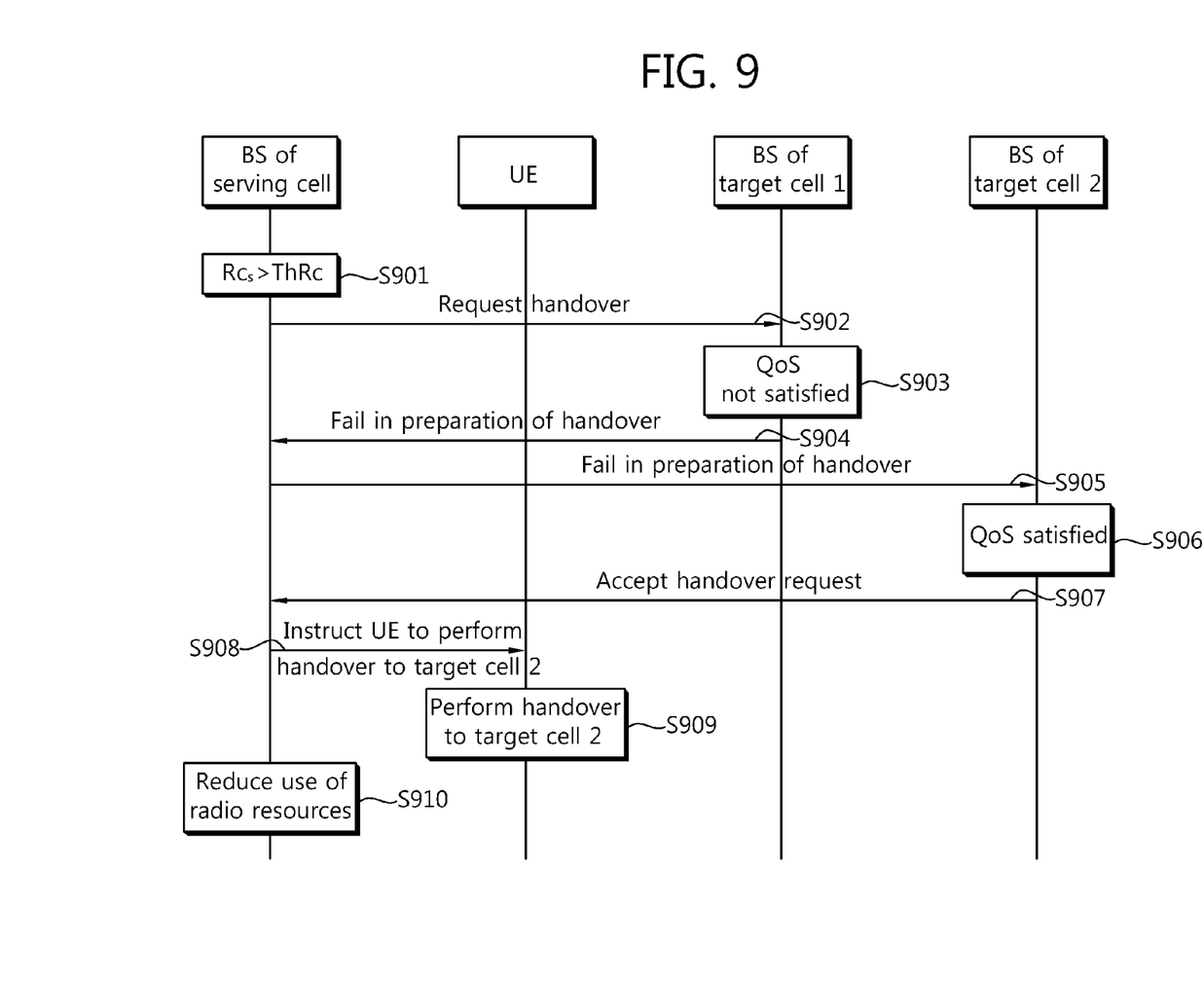
FIG. 9 is a diagram showing a process of performing handover according to another embodiment of the present invention.

FIG. 9 is a diagram showing a process of performing handover according to another embodiment of the present invention. The process of the BS of a serving cell performing handover to a BS through direct communication is described below with reference to FIG. 9.

The BS of the serving cell compares a threshold value for performing handover due to the congestion of BSs and a ratio of close neighboring cells in neighboring cells at step S901. Here, the threshold value (i.e., the subject of comparison with the ratio of the close neighboring cells in the neighboring cells) is referred to as a handover threshold value.

If, as a result of the comparison, the ratio $Rc_s$ of the close neighboring cell is greater than the handover threshold value ThRc ($Rc_s$>ThRc), the BS of the serving cell requests handover from the BS of a target cell 1 at step S902. When the handover is requested, the BS of the serving cell may also request a response about whether quality of service (QoS) has been satisfied in relationship with a relevant UE.

The target cell 1 may determine the handover based on a criterion, such as a cell which is the closest to a UE in distance or a cell having the strongest intensity of a reference signal in relationship with the UE or a neighboring cell that a UE has reported it as a close neighboring cell.

The BS of the target cell 1 may determine that the quality of service is not satisfied between the target cell 1 and the UE at step S903. In this case, the BS of the target cell 1 informs the BS of the serving cell that the preparation of the handover has failed at step S904.

The BS of the serving cell requests a response to the quality of service, along with a handover request, from the BS of a target cell 2 (i.e., yet another target cell) at step S905.

If the quality of service of the target cell 2 and the UE are satisfied to a predetermined level or higher at step S906, the target cell 2 sends a response, accepting the handover request for the UE, to the BS of the serving cell at step S907.

Next, the BS of the serving cell instructs the UE to perform handover to the target cell 2 at step S908. In response to the instruction, the UE performs handover to the target cell 2 at step S909. When the UE successfully performs the handover to the target cell 2, the BS may recover radio resources allocated to the UE in order to reduce radio resources being used in the serving cell at step S910.

If a serving cell has instructed all UEs within its service area to perform handover and thus any UE no longer exists within the service area, the serving cell may stop the use of radio resources (RB) and switch to an idle mode. If only some of UEs have performed handover, the serving cell may turn off the power of relevant BSs. In other words, according to an embodiment of the present invention, in order to reduce interference with neighboring cells and efficiently utilize radio resources, some of or all the BSs of serving cells may be turned on or off.

However, a BS may increase the use of radio resources and may operate in an active mode according to surrounding neighboring cells and a change of a traffic situation within its own service area. In this case, the BS may provide service to a UE again through handover.

In the case where a new UE appears within the service area of a BS of an idle mode and then requests service from the BS, if a UE performs handover to a neighboring cell through handover must perform handover to the BS of a previous serving cell because the traffic of the neighboring cell is increased and quality of service (QoS) is not guaranteed for the handovered UE or a BS switches to an active mode again at the request of a neighboring cell because the neighboring cell does not guarantee quality of service (QoS) for a UE within its service area, the BS of the idle mode switches to the active mode.

Here, the neighboring cell may be a target cell to which handover was attempted by the serving cell. Even in this case, the serving cell receives a UE, handovered through handover, through handover again.

The above description regarding the stop of use of radio resources, the switch to the idle mode or the active mode, or partial/full power on/off within the BS may be applied to the following description likewise.

Figure 10:
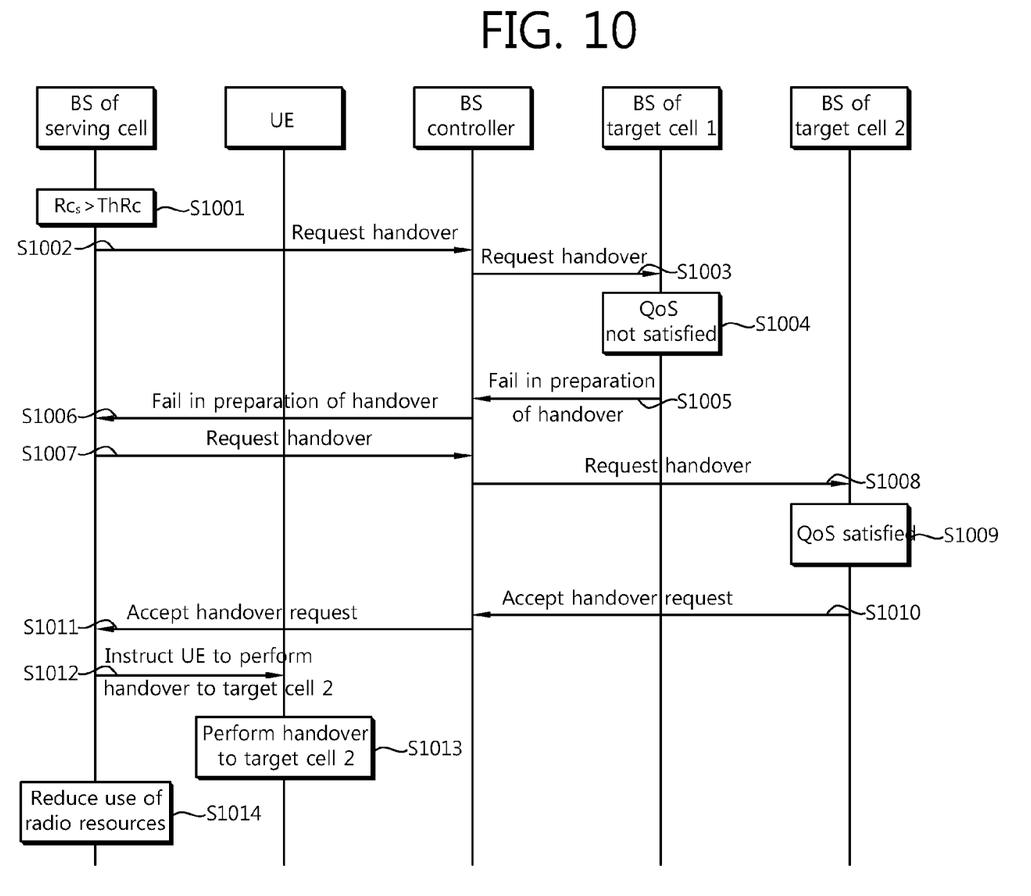
FIG. 10 is a diagram showing a process of performing handover according to yet another embodiment of the present invention.

FIG. 10 is a diagram showing a process of performing handover according to yet another embodiment of the present invention. The process of a BS and a UE performing handover through a controller, such as a BS controller or a network controller, is described below with reference to FIG. 10. Here, the BS controller may be a common RNC. If the BS is an f-BS, the BS controller may be an FNC.

The BS of the serving cell determines whether a ratio of close neighboring cells in neighboring cells is greater than a handover threshold value at step S1001. If, as a result of the determination, the ratio $Rc_s$ of the close neighboring cells is greater than the handover threshold value ThRc ($Rc_s$>ThRc), the BS of the serving cell transmits a handover request to the BS controller at step S1002. The BS of the serving cell may also request the measurement of QoS along with the handover request.

In response to the request, the BS controller transfers the handover request, etc. of the BS of the serving cell to the BS of a target cell 1 at step S1003. In response to the handover request, the BS of the target cell 1 may determine that the QoS has not been satisfied in relationship with the UE at step S1004. Accordingly, the BS of the target cell 1 notifies the BS controller that the preparation of the handover has failed at step S1005. The BS controller informs the BS of the serving cell that the preparation of the handover to the target cell 1 has failed at step S1006.

Accordingly, the BS of the serving cell transmits a handover request, etc. to the BS controller in order to attempt handover to another cell at step S1007. The BS controller transmits the handover request of the BS of the serving cell and the measurement of QoS or a response request or both to the BS of a target cell 2 at step S1008.

If QoS to be provided from the target cell 2 to the UE is a predetermined level or higher at step S1009, the BS of the target cell 2 transmits a response to the handover request to the BS controller at step S1010. In response to the response, the BS controller informs the BS of the serving cell that the handover request for the target cell 2 has been accepted at step S1011.

Accordingly, the BS of the serving cell which has received the response for the handover request of the BS of the target cell 2 instructs the UE to perform handover to the target cell 2 at step S1012. The UE performs handover to the target cell 2 at step S1013. When the handover is successfully performed, the BS of the serving cell stops the use of radio resources allocated to the UE, thereby reducing radio resources that have been used in the serving cell at step S1014.

Figure 11:
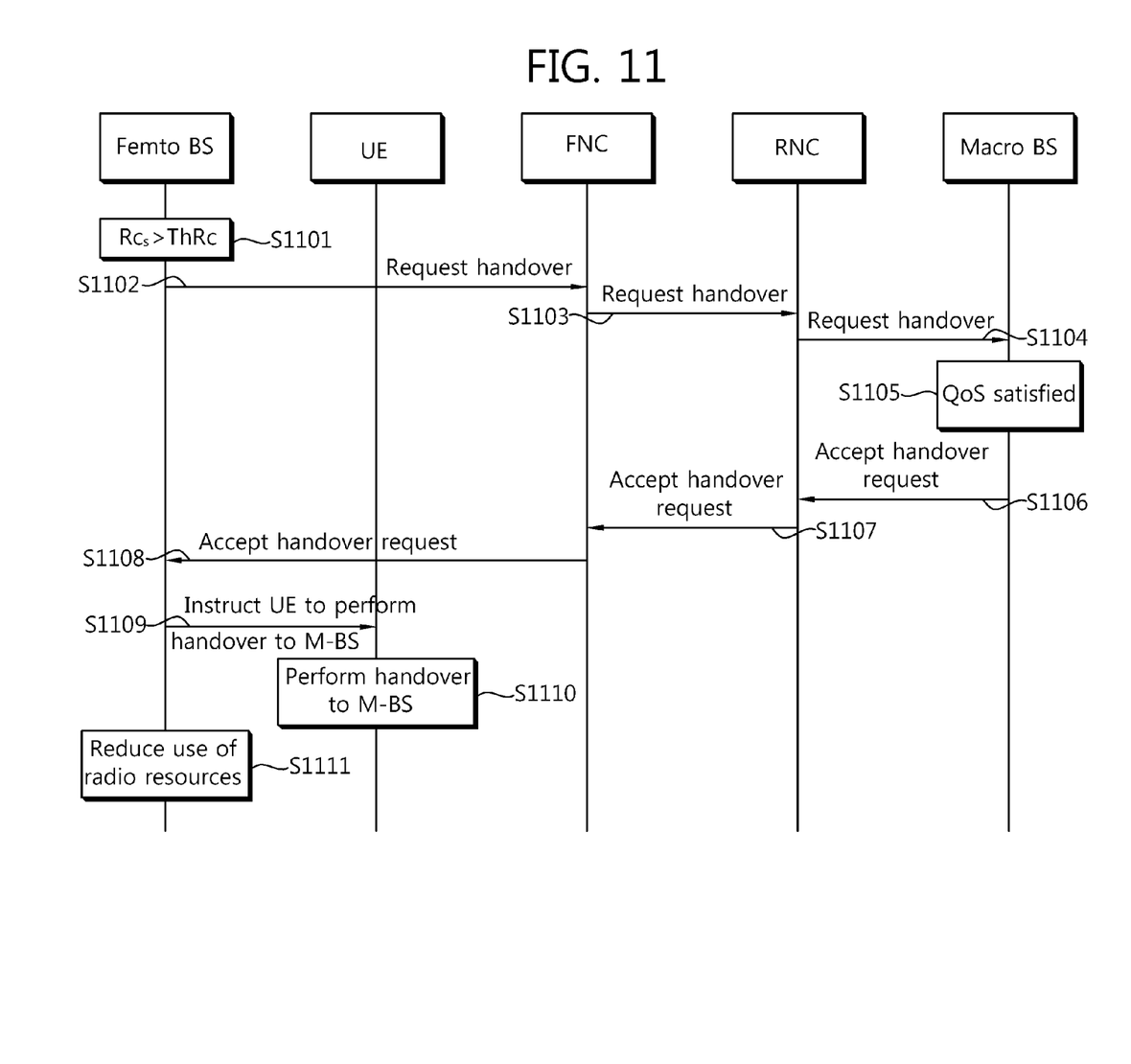
FIG. 11 is a diagram showing a process of performing handover according to further yet another embodiment of the present invention.

FIG. 11 is a diagram showing a process of performing handover according to further yet another embodiment of the present invention. The process of performing handover via an FNC and an RNC when a serving cell is an f-BS and a target cell is an M-BS is described with reference to FIG. 11.

The BS of the serving cell determines whether a ratio of close neighboring cells in neighboring cells is greater than a handover threshold value at step S1101. If, as a result of the determination, the ratio $Rc_s$ of the close neighboring cells is greater than the handover threshold value ThRc ($Rc_s$>ThRc), the BS of the serving cell transmits a handover request to the FNC at step S1002. In response to the request, the FNC transfers the handover request to the RNC at step S1103. The RNC transfers the handover request to the M-BS (i.e., a target cell BS) at step S1104.

If QoS of a predetermined level or higher is satisfied in relationship with a UE at step S1105, the BS of the target cell which has received the handover request from the f-BS transmits, to the RNC, a response to accept the handover request at step S1106. Accordingly, the RNC transfers the handover response of the BS of the target cell to the FNC at step S1107. The FNC transfers the handover response to the f-BS (i.e., the BS of the serving cell) at step S1108.

When the handover response is received, the BS of the serving cell instructs the UE to perform handover to the target cell at step S1109. Accordingly, the UE performs handover to the M-BS (i.e., the BS of the target cell) at step S1110. As described above with reference to FIG. 9 or 10, when the UE successfully performs the handover to the target cell, the BS of the serving cell may recover radio resources allocated to the UE in order to reduce radio resources that have been used by the serving cell at step S1111.

Figure 12:
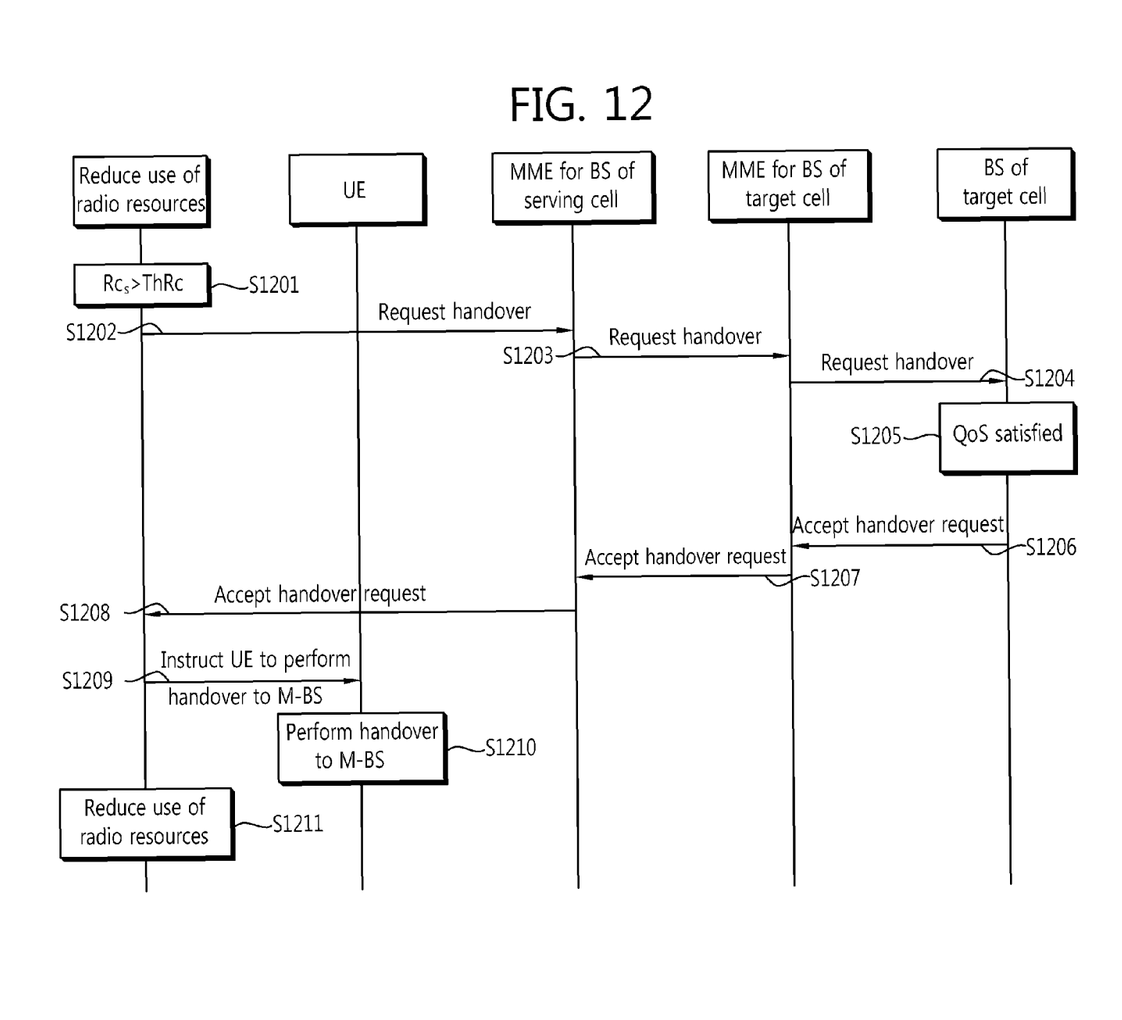
FIG. 12 is a diagram showing a process of performing handover according to further yet another embodiment of the present invention.

FIG. 12 is a diagram showing a process of performing handover according to further yet another embodiment of the present invention. The process of performing handover through MMEs is described with reference to FIG. 12. Here, an example in which any one of a serving cell and a target cell is a femtocell, the MME for the BS of the serving cell is different from the MME for the BS of the target cell, one of the two MMEs is the MME for an f-BS, and the other of the two MMEs is the MME for an M-BS is described below.

The BS of the serving cell determines whether a ratio of close neighboring cells in neighboring cells is greater than a handover threshold value at step S1201. If, as a result of the determination, the ratio $Rc_s$ of the close neighboring cells is greater than the handover threshold value ThRc ($Rc_s$>ThRc), the BS of the serving cell requests handover for a relevant UE from the MME for the BS of the serving cell (hereinafter referred to as an 'MME 1') at step S1202. In response to the request, the MME 1 transfers the handover request to the MME for the BS of the target cell (hereinafter referred to as an 'MME 2) at step S1203. The MME 2 transfers the handover request to the BS of the target cell at step S1204. Here, the serving cell may be a femtocell, the BS of the serving cell may be an f-BS, the MME 1 may be an MME for the f-BS, the target cell may be a common macrocell, the BS of the target cell may be an M-BS, and the MME 2 may be an MME for the M-BS.

If QoS of a predetermined level or higher is satisfied in relationship with the UE at step S1205, the BS of the target cell which has received the handover request transmits, to the MME 2, a response to accept the handover request at step S1206. Accordingly, the MME 2 transfers the handover response of the BS of the target cell to the MME 1 at step S1207. The MME 1 transfers the handover response to the BS of the serving cell at step S1208.

When the handover response is received, the BS of the serving cell instructs the UE to perform handover to the target cell at step S1209. In response to the instruction, the UE performs handover to the M-BS (i.e., the BS of the target cell) at step S1210. As described above with reference to FIGS. 9 to 11, when the UE successfully performs the handover to the target cell, the BS of the serving cell may recover radio resources allocated to the UE in order to reduce radio resources that have been used by the serving cell at step S1211.

The embodiments of the present invention may also be applied to a femtocell cellular system. In particular, when BSs are crowdedly installed, handover and the use of radio resources can be controlled using communication between f-BSs based on the measurement of a UE. Furthermore, such control is relatively simple because it is performed without help of a central control station in a process of determining handover or the use of radio resources.

Furthermore, a UE performs handover to a surrounding neighboring cell which satisfies QoS for the UE, and the use of radio resources is reduced or obviated. Accordingly, the generation of interference can be suppressed, and the system capacity can be increased. Furthermore, system environments, such as surrounding neighboring cells, a change of traffic within a serving cell area, and the degree of satisfaction of QoS can be adaptively handled.

All the above methods may be executed by a microprocessor, a controller, a microcontroller, a processor such as ASIC (Application Specific Integrated Circuit), or the processor of the UE shown in FIG. 3 according to software or program codes coded to execute the methods. It may be said that the design, development, and implementations of the codes are evident to those skilled in the art from the description of the present invention.

Although the embodiments of the present invention have been described above, a person having ordinary skill in the art will appreciate that the present invention may be modified and changed in various ways without departing from the technical spirit and scope of the present invention. Accordingly, the present invention is not limited to the above embodiments and the present invention may be said to include all embodiments within the scope of the claims below.

The invention claimed is:

1. A handover method, comprising the steps of:
receiving, by a base station from a user equipment, a cell measurement result for a neighboring cell;
determining, by the base station, whether the neighboring cell is a close neighboring cell based on the cell measurement result,
wherein the neighboring cell is determined as the close neighboring cell if an intensity value of a reference signal with the neighboring cell which is a subject of the cell measurement is greater than a first threshold value and an intensity value of a reference signal with a serving cell is greater than a second threshold value;
calculating, by the base station, a ratio of the close neighboring cells in all neighboring cells; and
if the ratio exceeds a handover threshold value, transmitting, by the base station to the user equipment, a handover command instructing the user equipment to perform handover to a target cell.

2. The handover method of claim 1, further comprising:
receiving a response to whether the target cell satisfies quality of service before transmitting the handover command, wherein if the target cell satisfies the quality of service, the handover command, instructing the user equipment to perform handover to the target cell, is transmitted.

3. The handover method of claim 1, further comprising:
recovering a resource block allocated to the user equipment, when the user equipment completes the handover to the target cell in response to the handover command.

4. The handover method of claim 1, further comprising:
switching to an idle mode if all user equipments within an area perform handover.

5. The handover method of claim 4, further comprising:
when a new user equipment enters the area or when a handover request is received from the target cell because the target cell does not satisfy quality of service for a user equipment within the target cell, switching to an active mode again.

6. The handover method of claim 5, further comprising:
restarting the use of the resource block whose use has been stopped, after switching to the active mode.

7. A handover method, comprising the steps of:
performing, by a user equipment, cell measurement for neighboring cells;
transmitting, by the user equipment to a base station, a cell measurement result according to the cell measurement;
if a ratio of neighboring cells classified as a close neighboring cell, from among the neighboring cells, according to the cell measurement result is a handover threshold value or higher, receiving, by the user equipment from the base station, a handover command instructing handover to a target cell,
wherein the neighboring cell is determined as the close neighboring cell if an intensity value of a reference signal with the neighboring cell which is a subject of the cell measurement is greater than a first threshold value and an intensity value of a reference signal with a serving cell is greater than a second threshold value; and
performing, by the user equipment, the handover to the target cell.

8. The handover method of claim 7, further comprising:
determining whether the neighboring cells correspond to the close neighboring cell before receiving the handover command from the base station, wherein the cell measurement result comprises a result indicating whether the neighboring cells correspond to the close neighboring cell.

9. The handover method of claim 7, wherein the base station is a femtocell base station.

10. A user equipment configured to perform a handover and comprising:
a communication unit; and
a processor operatively connected to the communication unit and configured to:
performing cell measurement for neighboring cells,
transmit to a base station a cell measurement result according to the cell measurement;
if a ratio of neighboring cells classified as a close neighboring cell, from among the neighboring cells, according to the cell measurement result is a handover threshold value or higher, receive from the base station a handover command instructing handover to a target cell,
wherein the neighboring cell is determined as the close neighboring cell if an intensity value of a reference signal with the neighboring cell which is a subject of the cell measurement is greater than a first threshold value and an intensity value of a reference signal with a serving cell is greater than a second threshold value, and
perform the handover to the target cell.

* * * * *